US012690709B2

(12) United States Patent
Mueller et al.

(10) Patent No.: US 12,690,709 B2
(45) Date of Patent: Jul. 28, 2026

(54) COOKING VESSEL

(71) Applicant: Miele & Cie. KG, Guetersloh (DE)

(72) Inventors: Christoph Mueller, Roedinghausen (DE); Britta Hoelscher, Hannover (DE); Nils Marius Gehring, Bielefeld (DE)

(73) Assignee: MIELE & CIE. KG, Guetersloh (DE)

( * ) Notice: Subject to any disclaimer, the term of this patent is extended or adjusted under 35 U.S.C. 154(b) by 753 days.

(21) Appl. No.: 18/245,742

(22) PCT Filed: Aug. 24, 2021

(86) PCT No.: PCT/EP2021/073375
§ 371 (c)(1),
(2) Date: Mar. 17, 2023

(87) PCT Pub. No.: WO2022/063506
PCT Pub. Date: Mar. 31, 2022

(65) Prior Publication Data
US 2023/0346158 A1 Nov. 2, 2023

(30) Foreign Application Priority Data

Sep. 22, 2020 (DE) ........................ 102020124615.3

(51) Int. Cl.
*A47J 27/00* (2006.01)
*A47J 36/16* (2006.01)
(Continued)

(52) U.S. Cl.
CPC ............. *A47J 27/002* (2013.01); *A47J 36/16* (2013.01); *A47J 36/36* (2013.01); *H05B 6/062* (2013.01); *A47J 2202/00* (2013.01)

(58) Field of Classification Search
CPC ........ A47J 27/002; A47J 27/004; A47J 36/16; A47J 36/36
See application file for complete search history.

(56) References Cited

U.S. PATENT DOCUMENTS 8,796,598 B2 * 8/2014 England ................ A47J 27/002
219/623
10,646,068 B2 * 5/2020 He .......................... A47J 36/32
(Continued)

FOREIGN PATENT DOCUMENTS

CN 110960070 A * 4/2020 ............. A47J 27/04
DE 102013006649 A1 10/2014

*Primary Examiner* — Helena Kosanovic
*Assistant Examiner* — John S Hunter, Jr.
(74) *Attorney, Agent, or Firm* — LEYDIG, VOIT & MAYER, LTD.

(57) ABSTRACT

A cooking vessel includes: a vessel body with at least one handle arranged on the vessel body, the vessel body delimiting a space for receiving food to be cooked, which space is open at a top in a use position of the cooking vessel and is intended for receiving food to be cooked, the vessel body having an outer shell which is connected or connectable to the handle, and an inner shell which is connected to the outer shell when the cooking vessel is assembled, the outer shell receiving the inner shell when the cooking vessel is assembled, and the space for receiving food to be cooked being formed in the inner shell. A wall inner face of the outer shell, which faces the inner shell, and a wall outer face of the inner shell, which faces the outer shell, are each conical.

12 Claims, 6 Drawing Sheets

(51) Int. Cl.
  *A47J 36/36*    (2006.01)
  *H05B 6/06*    (2006.01)

(56)     References Cited

U.S. PATENT DOCUMENTS

| | | | |
|---|---|---|---|
| 11,445,579 B2 * | 9/2022 | Park | A47J 27/004 |
| 2008/0202349 A1 * | 8/2008 | Peng | A47J 36/165 |
| | | | 99/329 R |
| 2009/0065500 A1 | 3/2009 | England et al. | |
| 2010/0116819 A1 | 5/2010 | Pan et al. | |

* cited by examiner 30    22    18    26    14    34    32    6

6    2    4    10

COOKING VESSEL

CROSS-REFERENCE TO PRIOR APPLICATIONS

This application is a U.S. National Phase application under 35 U.S.C. § 371 of International Application No. PCT/EP2021/073375, filed on Aug. 24, 2021, and claims benefit to German Patent Application No. DE 10 2020 124 615.3, filed on Sep. 22, 2020. The International Application was published in German on Mar. 31, 2022 as WO/2022/063506 A1 under PCT Article 21(2).

FIELD

The invention relates to a cooking vessel.

BACKGROUND

Such cooking vessels are already known from the prior art in a large number of embodiments. Thus, the document DE 10 2013 006 649 A1 discloses, for example, a vessel body and at least one handle arranged on the vessel body, the vessel body delimiting a space for receiving food to be cooked, which space is open at the top in the use position of the cooking vessel and is intended for receiving food to be cooked.

U.S. 2010/0116819 A1 discloses a cooking vessel having an induction coil for transmitting electrical energy to the cooking vessel.

U.S. 2009/0065500 A1 discloses a double-walled cooking vessel having an insulating means between the two walls.

SUMMARY

In an embodiment, the present invention provides a cooking vessel, comprising: a vessel body with at least one handle arranged on the vessel body, the vessel body delimiting a space for receiving food to be cooked, which space is open at a top in a use position of the cooking vessel and is intended for receiving food to be cooked, the vessel body comprising an outer shell which is connected or connectable to the handle, and an inner shell which is connected to the outer shell when the cooking vessel is assembled, the outer shell receiving the inner shell when the cooking vessel is assembled, and the space for receiving food to be cooked being formed in the inner shell, wherein a wall inner face of the outer shell, which faces the inner shell when the cooking vessel is assembled, and a wall outer face of the inner shell, which faces the outer shell when the cooking vessel is assembled, are in each case designed conically in a mutually corresponding manner, and wherein the outer shell, on a base inner face of a base of the outer shell facing the inner shell, and the inner shell, on a base outer face of a base of the inner shell facing the outer shell, in each case comprise mutually corresponding centering means which are in engagement with one another when the cooking vessel is assembled, and/or wherein the cooking vessel has a plurality of sensors which are arranged distributed over a height of the wall inner face of the outer shell, the plurality of sensors being connected to a controller of the cooking vessel in a signal-transmitting manner, the plurality sensors being arranged on the outer shell so as to be movable, relative to the outer shell, in a resilient manner.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
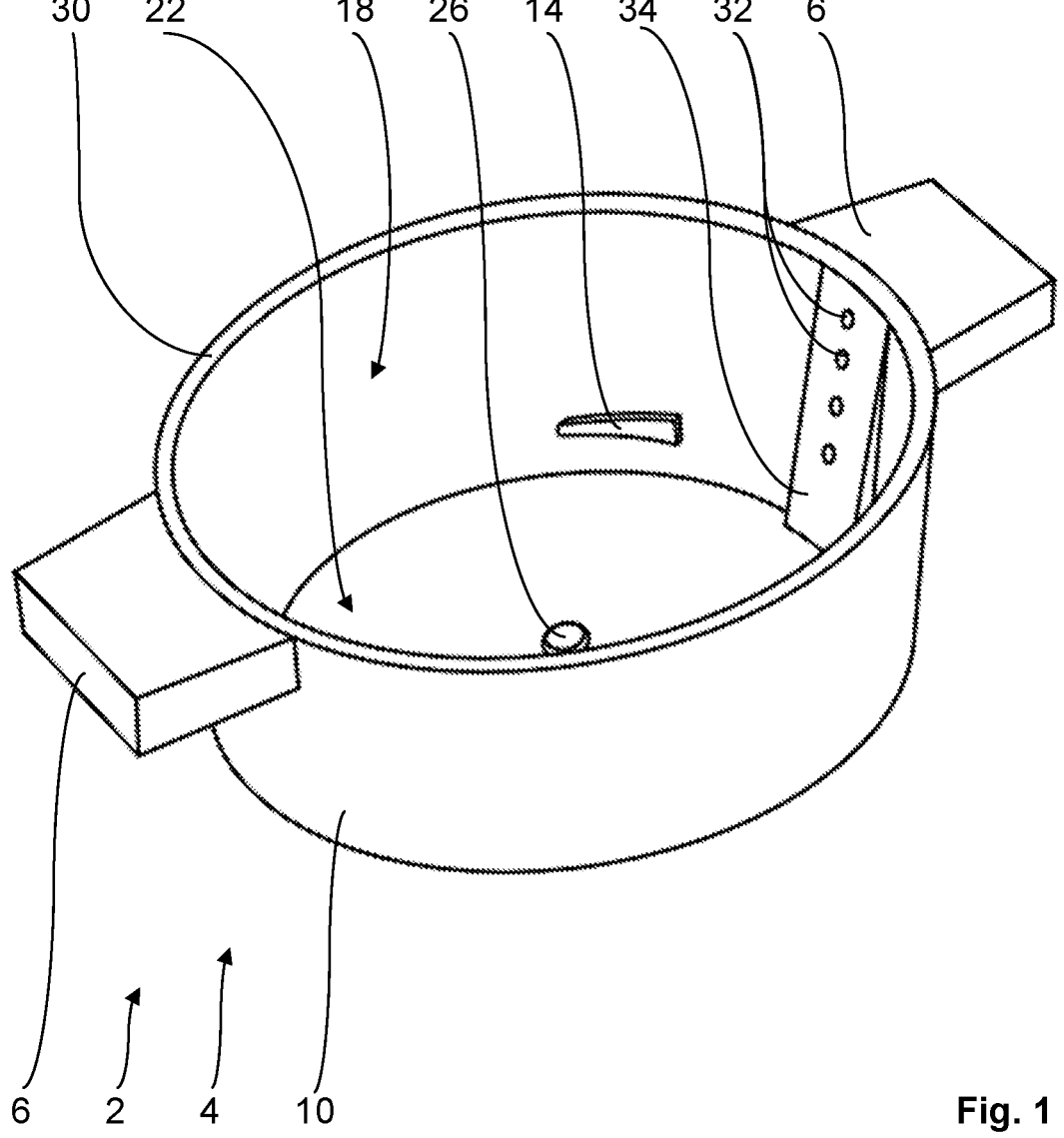
FIG. 1 is a perspective individual view of the outer shell of the cooking vessel according to the invention according to the present embodiment.

In an embodiment, the present invention provides a solution that improves a cooking vessel of this kind.

In an embodiment, the present invention provides a cooking vessel, characterized in that the vessel body comprises an outer shell which is or can be connected to the handle and an inner shell which is connected to the outer shell when the cooking vessel is assembled, the outer shell receiving the inner shell when the cooking vessel is assembled, and the space for receiving food to be cooked being formed in the inner shell. In this case, the cooking vessel according to the invention can be freely selected within wide suitable limits according to type, mode of operation, material, dimensions and shape. For example, the cooking vessel can be a saucepan, a roasting dish or a frying pan. The cooking vessel according to the invention can be suitable for use on an induction hob, a gas hob or a multiple cooktop having a radiant heating element. The space for receiving food to be cooked of the cooking vessel according to the invention, which space is open at the top in the use position of the cooking vessel, can be covered during use of the cooking vessel, i.e. for example during the cooking process by means of the cooking vessel, in a manner known to a person skilled in the art by means of a lid or the like. However, this is not absolutely necessary and is applied by a user of the cooking vessel according to the requirements of the individual case. In the cooking vessel according to the invention, the at least one handle can be designed, for example, as an integral component of the outer shell. It is also conceivable that the at least one handle is designed as a separate component, the handle being connected to the outer shell, in a manner known to a person skilled in the art, during the production of the cooking vessel according to the invention, i.e. during the transfer into its assembled state. Advantageous embodiments and developments of the invention can be found in the following description.

An advantage that is achievable by the invention is in particular that a cooking vessel comprising a vessel body and at least one handle arranged on the vessel body, the vessel body delimiting a space for receiving food to be cooked which is open at the top in the use position of the cooking vessel and is intended for receiving food to be cooked, is improved. Due to the design according to the invention of the cooking vessel, a functional separation between the outer shell and the inner shell is made possible. Accordingly, both the outer shell and the inner shell can be designed in a manner adapted to their specific requirements. For example, this can be used advantageously in the selection of materials for the outer shell and the inner shell. It is also conceivable that the outer shell is used as the part of the vessel body on or in which the entire electronics of the cooking vessel according to the invention are arranged. This is advantageous in particular in the case of cooking vessels which are equipped in a particularly high-quality manner with a large number of electronic functions, such as operating and display functions for the cooking vessel and/or for a hob, together with which the cooking vessel forms a system for cooking the food to be cooked located in the space for receiving food to be cooked of the cooking vessel, as well as sensors for detecting cooking vessel parameters and/or parameters of food to be cooked. In contrast to the above-mentioned highly functional outer shell, the inner shell can then be designed, for example, to be as suitable as possible for the receptacle for food to be cooked and/or the cleaning and care of the space for receiving food to be cooked. Furthermore, it is possible to provide a cavity between the outer shell and the inner shell, which cavity can then, for example, additionally be used for at least one further functionality.

An advantageous development of the cooking vessel according to the invention provides that the inner shell is releasably connected to the outer shell when the cooking vessel is assembled, preferably that the inner shell and the outer shell have mutually corresponding interlocking means for forming the releasable connection, preferably that the mutually corresponding interlocking means are designed as bayonet locking means for forming a bayonet closure. As a result, it is possible to use one outer shell for a plurality of inner shells. This is a significant advantage, for example, in the production process, since a single type of outer shell can thus cover a large number of variants of cooking vessels according to the invention. For example, the inner shells of the respective cooking vessels according to the invention can differ in whether they are equipped with a non-stick coating or not. The inner shells of such cooking vessels according to the invention can also differ by the material used, for example stainless steel. In addition, the possibility of combining an outer shell with a plurality of inner shells corresponding thereto in this way is also conceivable on the part of the user. For example, depending on the requirements of the individual case, the user could change the inner shell of the cooking vessel according to the invention. Such inner shells could also be sold significantly more cheaply compared with a complete cooking vessel according to the invention.

In this case, the releasable connection between the outer shell and the inner shell can be realized in any meaningful manner known to a person skilled in the art. The preferred embodiment of this development also has the advantage that the releasable connection is realized in a simple and robust manner in terms of design and production technology. Furthermore, the preferred embodiment of this development has the further advantage that the inner shell can be connected to the outer shell particularly closely by means of the bayonet closure, since the inner shell can be tightened firmly on the outer shell during the production of the bayonet closure. In principle, however, it is also conceivable for the outer shell and the inner shell to be non-releasably connected, in a manner known to a person skilled in the art, during the production of the cooking vessel according to the invention.

The cooking vessel according to the invention provides that a wall inner face of the outer shell facing the inner shell when the cooking vessel is assembled, and a wall outer face of the inner shell facing the outer shell when the cooking vessel is assembled, are in each case designed conically in a mutually corresponding manner. In this way, joining of the outer shell and the inner shell in order to produce the cooking vessel according to the invention is significantly simplified. In this case, component tolerances which are unavoidable in the production process are also less critical, such that the outer shell and the inner shell can be manufactured having greater component tolerances. Furthermore, this development enables a close connection between the outer shell and the inner shell, in a simple manner in terms of design and production technology.

The cooking vessel according to the invention provides that the outer shell, on a base inner face of a base of the outer shell facing the inner shell, and the inner shell, on a base outer face of a base of the inner shell facing the outer shell, in each case comprise mutually corresponding centering means which are in engagement with one another when the cooking vessel is assembled. As a result, a proper and thus functionally reliable assembly of the cooking vessel according to the invention is substantially promoted.

This advantage applies in particular to the preferred embodiment of this development, in which the centering means are arranged centrally on the relevant base.

One aspect is that the inner shell and the outer shell latch together when the end position of an assembled state is reached. A closing force must be overcome in this case. According to one embodiment, the latching can be released again when an opening force is overcome. The magnitude of the closing force is preferably less than or equal to the magnitude of the opening force.

A further advantageous development of the cooking vessel according to the invention provides that a peripheral seal is arranged between the outer shell and the inner shell when the cooking vessel is assembled. This ensures that liquid or dirt cannot get between the outer shell and the inner shell in an undesired manner. Accordingly, this also ensures the proper functioning of the cooking vessel according to the invention over a long overall use period, i.e. a long lifetime of the cooking vessel according to the invention. This also significantly simplifies cleaning and care of the cooking vessel according to the invention.

Another advantageous development of the cooking vessel according to the invention provides that the cooking vessel is designed as an induction vessel, an induction coil which is electrically conductively connected to a controller of the cooking vessel being arranged on a base of the outer shell, for inductive coupling to an induction hob, preferably that the induction coil is arranged on a base inner face of the base facing the inner shell, the outer shell being made of an electrically non-conductive material. As a result, the use of the cooking vessel according to the invention on a hob equipped as an induction hob is made possible. Moreover, electronics of the cooking vessel according to the invention can be supplied with energy by means of the induction coil of the cooking vessel, such that for example an energy store arranged in the cooking vessel according to the invention is chargeable for supplying the aforementioned electronics with electrical energy by means of an inductive coupling between the induction coil of the cooking vessel according to the invention and a heating coil of the induction hob on which the cooking vessel according to the invention is placed. In addition, the preferred embodiment of this development has the advantage that the induction coil is arranged in an interior of the cooking vessel according to the invention that is protected against environmental influences. The electrically non-conductive material of the outer shell according to the preferred embodiment of this development can be, for example, an electrically non-conductive metal.

An advantageous development of the cooking vessel according to the invention provides that the inner shell or the inner shell and the outer shell is/are formed of a material suitable for a dishwasher. In this way, the cleaning and the care of the cooking vessel according to the invention is additionally facilitated and thus designed to be significantly more user-friendly. The first-mentioned alternative of this development, in which only the inner shell is designed to be suitable for a dishwasher, is expedient when the outer shell and the inner shell can be releasably interconnected.

The cooking vessel according to the invention provides that the cooking vessel has at least one sensor which is connected to a controller of the cooking vessel in a signal-transmitting manner. This makes it possible to detect cooking vessel parameters and/or parameters of food to be cooked, such as a temperature of the inner shell of the cooking vessel, the at least one sensor being structurally associated with the outer shell. Thus, advantageous use is made of the division of the cooking vessel according to the invention, in functional terms, since the inner shell can be designed correspondingly more freely.

One aspect is that the at least one sensor is arranged on a wall inner face and/or base inner face of the outer shell, facing the inner shell in each case, preferably that the at least one sensor is resiliently arranged on the outer shell. This has the advantage that the sensor is protected from environmental influences that impair the function of the sensor, and can be arranged in close contact with the outer shell and/or the inner shell on the outer shell. This applies in particular to the preferred embodiment of this development. A resilient arrangement of the at least one sensor on the outer shell is to be understood to mean that the at least one sensor is arranged on the outer shell so as to be movable, relative to the outer shell, in a resilient manner.

The cooking vessel according to the invention provides that the cooking vessel has a plurality of sensors, in particular that the at least one sensor is designed as a plurality of sensors, the plurality of sensors being distributed over a height of the wall inner face of the outer shell. The use of a plurality of sensors allows for a qualitatively high-quality detection of the above-mentioned parameters. In particular, it is provided that the cooking vessel has at least two sensors. According to a preferred embodiment, a number of 3 to 9 sensors is provided, which are in particular at the same distance from one another.

One aspect is that the at least one sensor is arranged on a wedge diverging in the direction of the base of the outer shell, and the wedge being designed as a resilient wedge and being fastened to the outer shell and/or being resiliently fastened to the outer shell. In this way, the cooking vessel parameter and/or parameter of the food to be cooked detected by the at least one sensor, for example the aforementioned temperature of the inner shell of the cooking vessel according to the invention, can be determined distributed over the height. Furthermore, by means of the wedge, the sensors distributed over the height, in spite of any component tolerances, come into close contact with the inner shell of the cooking vessel according to the invention, such that a qualitatively high-quality detection of the aforementioned parameters is made possible by means of all the sensors.

This design of the cooking vessel is particularly suitable in conjunction with the development according to which the wall inner face of the outer shell facing the inner shell when the cooking vessel is assembled, and the wall outer face of the inner shell facing the outer shell when the cooking vessel is assembled, are in each case designed conically in a mutually corresponding manner.

Another advantageous development of the cooking vessel according to the invention provides that a thermal insulation means is arranged between the outer shell and the inner shell when the cooking vessel is assembled, preferably that the thermal insulation means is arranged between a base inner face of the outer shell and a base outer face of the inner shell, preferably that the thermal insulation means is designed as an aerogel. As a result, a thermal decoupling of the outer shell from the inner shell is made possible in a simple manner in terms of design and production technology. Such a thermal decoupling is, for example, expedient or even necessary when a cooking vessel according to the invention designed as an induction cooking vessel is to be operated on a hob designed as a fully integrated induction hob. Fully integrated induction hobs of this kind are intended to be integrated homogeneously into a living space or the like, the related technology of these induction hobs being arranged under a stone, granite, ceramic plate or the like. Accordingly, the temperature on a base outer face of a base of the cooking vessel according to the invention facing the fully integrated induction hob must be able to be limited to 120° C. or less.

For this purpose, alternatively or in addition to the above-mentioned embodiment of the cooking vessel according to the invention, it can be provided, in a further advantageous development of the cooking vessel according to the invention, that the outer shell has at least one groove on a base outer face of the base facing away from the inner shell when the cooking vessel is assembled, preferably that the groove is designed and arranged such that, when the cooking vessel is placed on a hob, air from a free environment passes between the base of the outer shell of the cooking vessel and the hob by means of the groove.

FIGS. 1 to 4b show an embodiment of the cooking vessel according to the invention, purely by way of example.

The cooking vessel 2 is designed as an induction saucepan for use on a hob designed as an induction hob. The cooking vessel 2 comprises a vessel body 4 and two handles 6 arranged on the vessel body 4, the vessel body 4 delimiting a space 8 for receiving food to be cooked, which space is open at the top in a use position of the cooking vessel 2 shown in FIGS. 3a to 4b and is intended for receiving food to be cooked.

According to the invention, the vessel body 4 comprises an outer shell 10 which can be connected to the handles 6, and an inner shell 12 which is connected to the outer shell 10 in an assembled state of the cooking vessel 2 shown in FIGS. 3a to 4b, the outer shell 10 receiving the inner shell 12 when the cooking vessel 2 is assembled, and the space 8 for receiving food to be cooked being formed in the inner shell 12. In the present embodiment, the outer shell 10 is made of an electrically non-conductive, i.e. non-conducting, material, whereas the inner shell 12 is formed from a material suitable for a dishwasher, namely stainless steel.

When the cooking vessel 2 is assembled, the inner shell 12 is releasably connected to the outer shell 10, the inner shell 12 and the outer shell 10 having mutually corresponding interlocking means for forming the releasable connection, namely to the effect that the mutually corresponding interlocking means are designed as bayonet locking means 14, 16 for forming a bayonet closure. In the present embodiment, the mutually corresponding bayonet locking means 14, 16 are designed as two wedge-shaped projections arranged on mutually opposing wall inner faces 18 of a wall of the outer shell 10 and two elongate projections designed to correspond to the aforementioned wedge-shaped projections on mutually opposing wall outer faces 20 of a wall of the inner shell 12. See in this respect FIGS. 1 and 2 in conjunction with FIGS. 3a and 3b.

Furthermore, the wall inner face 18 of the outer shell 10 facing the inner shell 12 when the cooking vessel 2 is assembled and the wall outer face 20 of the inner shell 12 facing the outer shell 10 when the cooking vessel 2 is assembled are in each case designed conically in a mutually corresponding manner. See in this respect FIGS. 3a to 4b.

Furthermore, the outer shell 10, on a base inner face 22 of a base of the outer shell 10 facing the inner shell 12, and the inner shell 12, on a base outer face 24 of a base of the inner shell 12 facing the outer shell 10, in each case comprise mutually corresponding centering means 26, 28 which are in engagement with one another when the cooking vessel 2 is assembled, the centering means 26, 28 being arranged centrally on the relevant base. In the present embodiment, the centering means 26, 28 are designed as a centering pin which rises from the base inner face 22 of the base of the outer shell 10, and a centering receptacle arranged in the base outer face 24 of the base of the inner shell 12. See in this respect FIGS. 1 and 2, and 3a and 4a.

Figure 2:
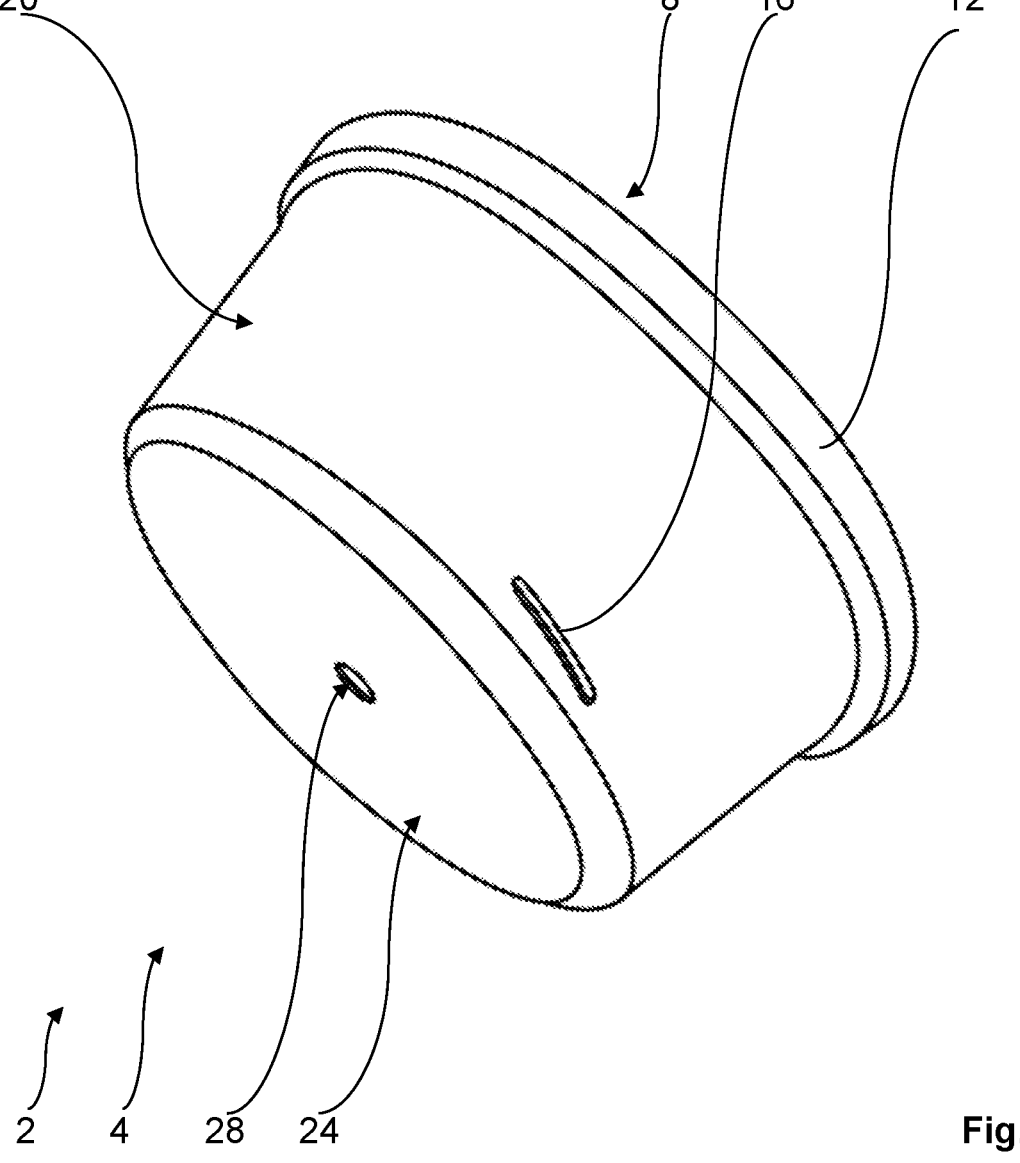
FIG. 2 is a perspective individual view of the inner shell of the cooking vessel according to the invention according to the present embodiment.
Figure 3A:
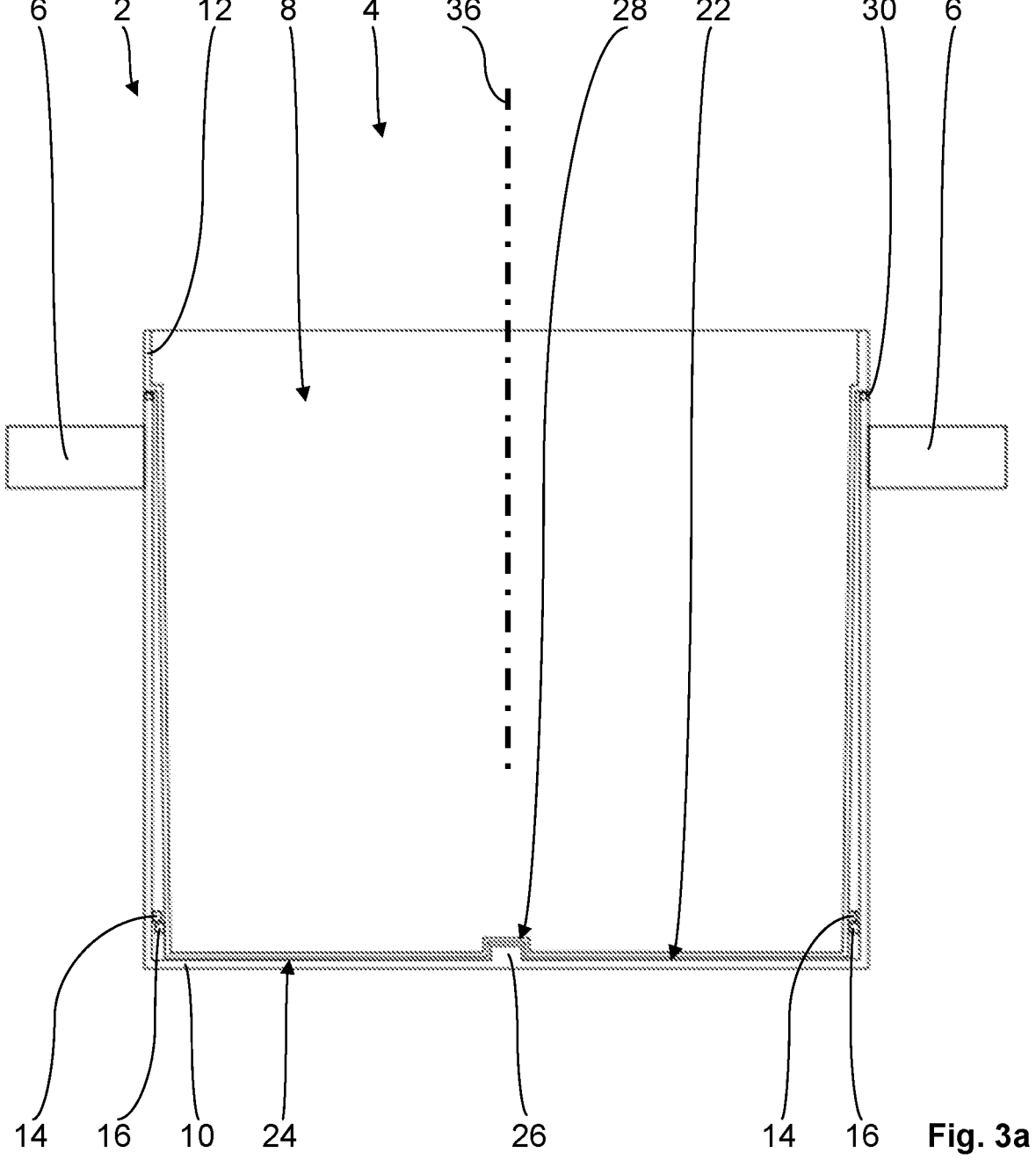
FIG. 3*a* is a first sectional side view of the embodiment of the cooking vessel according to the invention in its assembled state.
Figure 3B:
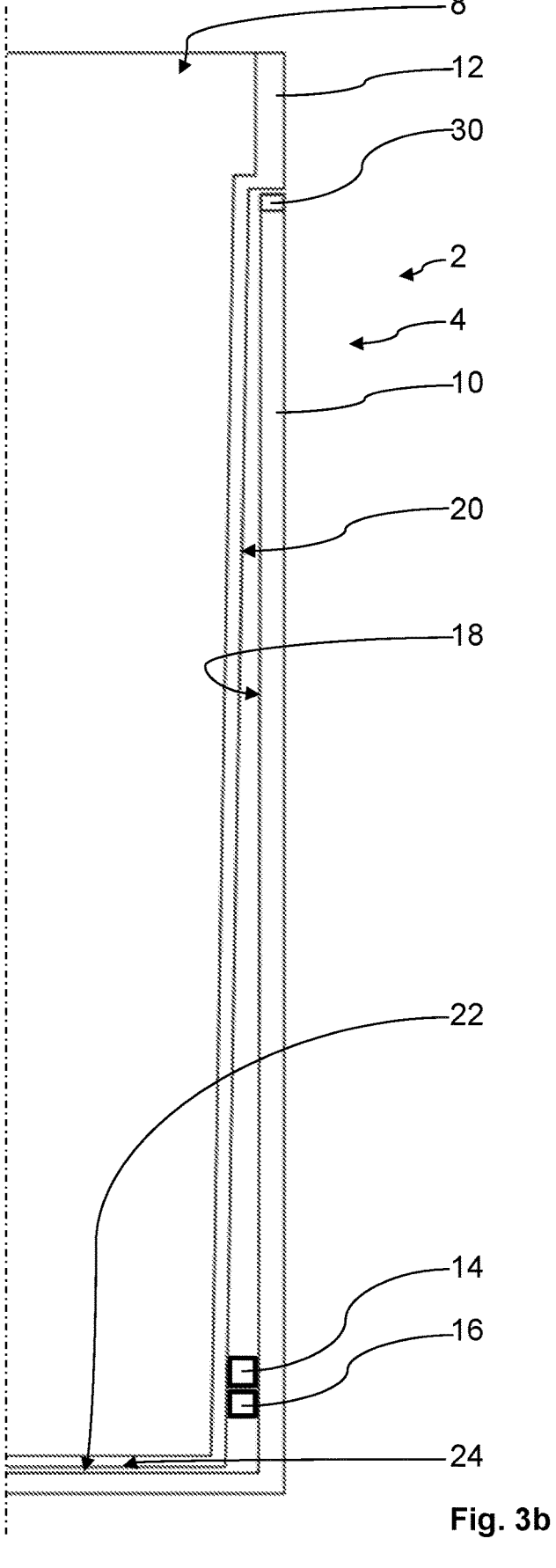
FIG. 3*b* is a detail view of the embodiment according to FIG. 3*a*, in the region of the bayonet closure.
Figure 4A:
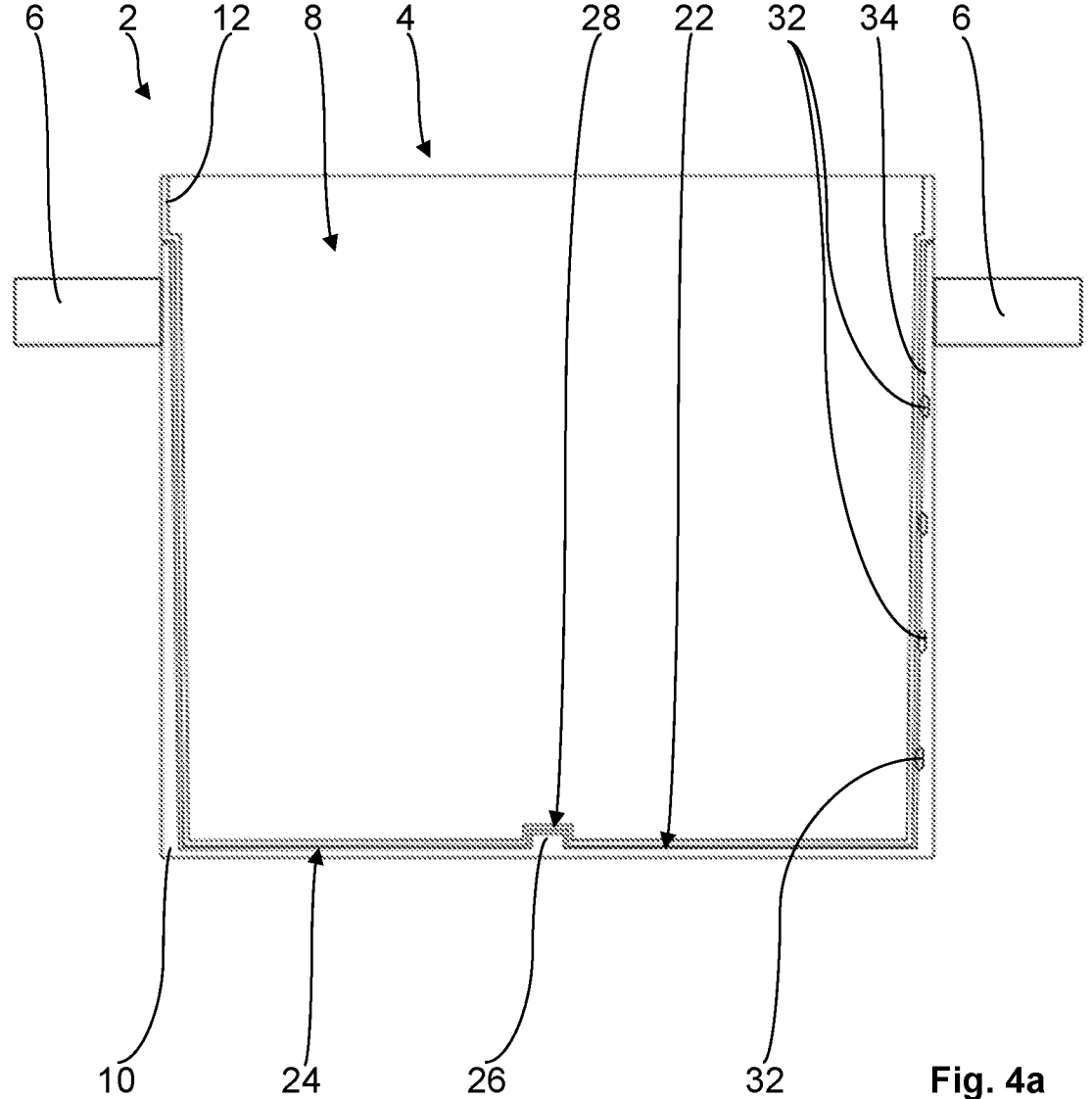
FIG. 4*a* is a second sectional side view of the embodiment of the cooking vessel according to the invention in its assembled state.
Figure 4B:
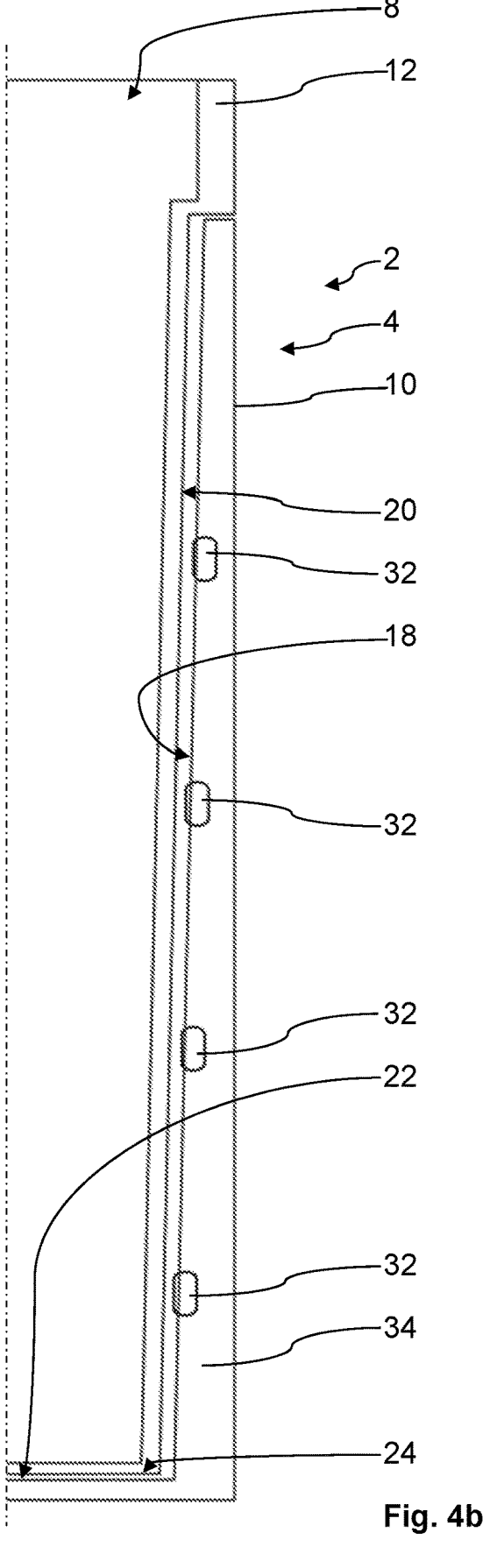
FIG. 4*b* is a detail view of the embodiment according to FIG. 4*a*, in the region of the sensors.

In order to close an intermediate space between the outer shell 10 and the inner shell 12 in a liquid-tight and dust-tight manner when the cooking vessel 2 is assembled, a peripheral seal 30 is arranged between the outer shell 10 and the inner shell 12 in the assembled state of the cooking vessel 2 shown in FIGS. 3a to 4b. The seal 30 can be designed, for example, as a silicone seal. Furthermore, the seal 30 can be fastened to the outer shell 10 in a manner known to a person skilled in the art, for example, or can be designed as an integral component of the outer shell 10. See in this respect for example FIGS. 3a and 3b. In FIGS. 2, 4a and 4b, the seal is not shown.

As already stated above, the cooking vessel 2 is designed as an induction cooking vessel. In order, for example, to supply electrical current to a controller arranged in one of the two handles 6 and operating and/or display elements of the cooking vessel 2 which are connected to the controller in a current-conducting manner, in the present embodiment an induction coil which is electrically conductively connected to the controller of the cooking vessel 2 is arranged on the base of the outer shell 10, for inductive coupling to the induction hob, the induction coil being arranged on the base inner face 22 of the base of the outer shell 10. The controller, the operating and/or display elements and the induction coil of the cooking vessel 2 are not shown in FIGS. 1 to 4b. In addition, the cooking vessel can further comprise a rechargeable energy store which is connected in a current-conducting manner to the induction coil and to the controller, as well as to the operating and/or display elements, by means of which energy store the electrical energy coupled into the cooking vessel from the induction coil can be temporarily stored in order then to be distributed, as required, to the controller and to the operating and/or display elements.

Furthermore, the cooking vessel 2 has a plurality of sensors 32 which are connected to the aforementioned controller of the cooking vessel 2 in a signal-transmitting manner and are designed as temperature sensors, said sensors being intended in each case for detecting a temperature of the wall outer face 20 of the inner shell 12 of the cooking vessel 2 when the cooking vessel 2 is assembled, the sensors 32 being arranged on the wall inner face 18 of the outer shell 10. Furthermore, a further sensor designed as a temperature sensor, for detecting a temperature of the base of the inner shell 12, is arranged on the base inner face 22 of the outer shell 10, this further sensor being arranged, in the present embodiment, on the centering means 26 designed as a centering pin. For the purpose of close contact of this further sensor on the base outer face 24 of the base of the inner shell 12, the centering means 26 is either designed resiliently and/or arranged resiliently on the base inner face 22 of the base of the outer shell 10, in a manner not shown in more detail, analogous to the aforementioned sensors 32. The further sensor is not shown in FIGS. 1 to 4b.

As can be seen from FIGS. 4a and 4b, the sensors 32 are arranged distributed over a height of the wall inner face 18 of the outer shell 10, the sensors 32 being arranged on a wedge 34 diverging in the direction of the base of the outer shell 10, and the wedge 34 being designed as a resilient wedge and being fastened to the outer shell 10. Alternatively or additionally, the wedge can be resiliently fastened to the outer shell in a manner known to a person skilled in the art.

The mode of operation of the cooking vessel according to the invention, according to the present embodiment, is explained in more detail below with reference to FIGS. 1 to 4b.

The cooking vessel 2 is initially present in a disassembled state of the cooking vessel 2, shown in FIGS. 1 and 2. For the purpose of transferring the cooking vessel 2 into the assembled state of the cooking vessel 2 shown in FIGS. 3a to 4b, during the production of the cooking vessel 2 a fitter grips the inner shell 12 and pushes it, with the base of the inner shell 12 in front, into the outer shell 10 in such a way that the bayonet locking means 14, 16 of the outer shell 10 and the inner shell 12 are not in engagement with one another. Accordingly, the bayonet locking means 16 arranged on the inner shell 12 can be guided past the bayonet closure means 14 arranged on the outer shell 10 during the aforementioned insertion of the inner shell 12 into the outer shell 10, such that the bayonet locking means 16 of the inner shell 12 are arranged below the bayonet locking means 14 of the outer shell 10 in the relevant image plane of FIGS. 3a and 3b. During the aforementioned insertion of the inner shell 12 into the outer shell 10, the centering means 26, 28 ensure that the inner shell 12 is correctly aligned relative to the outer shell 10, transversely to the relevant image plane of FIGS. 3a to 4b. Subsequently, the mutually corresponding bayonet locking means 14, 16 are brought into engagement with one another by the fitter rotating the inner shell 12 about an axis of rotation 36 shown in FIG. 3a in such a way that the bayonet locking means 16 of the inner shell 12 engage under and/or snap into the bayonet locking means 14 of the outer shell 10, as can be seen from FIGS. 3a and 3b. The cooking vessel 2 is in its assembled state shown in FIGS. 3a to 4b.

During the aforementioned insertion of the inner shell 12 into the outer shell 10 of the cooking vessel 2, the sensors 32 arranged on the wedge 34 come into close contact with the wall outer face 20 of the inner shell 12. The same applies to the further temperature sensor, which is arranged on the centering means 26.

During operation of the cooking vessel 2 in the case of a cooking vessel 2 placed on the induction hob, it would now be possible to automatically detect the temperature distribution on the wall outer face 20 of the inner shell 12 by means of the sensors 32, and to automatically detect the temperature on the base outer face 24 of the inner shell 12 by means of the further sensor, for example for actuating the induction hob.

By means of the induction coil of the cooking vessel 2 arranged in the base of the outer shell 10, in the aforementioned operation of the cooking vessel 2 the controller and the operating and/or display elements of the cooking vessel 2 can also be supplied with electrical energy directly or indirectly, for example by means of the rechargeable energy storage device, which is also already mentioned.

However, the invention is not limited to the present embodiment and the above-mentioned alternatives. See in this respect, purely by way of example, the remarks in the introduction to the description.

Furthermore, it can be provided in other embodiments of the cooking vessel according to the invention that a thermal insulation means is arranged between the outer shell and the inner shell when the cooking vessel is assembled, preferably that the thermal insulation means is arranged between a base inner face of the outer shell and a base outer face of the inner shell, particularly preferably that the thermal insulation means is designed as an aerogel. As a result, a thermal decoupling of the outer shell on one side from the inner shell is made possible in a simple manner in terms of design and production technology. This applies particularly to the preferred, and in particular to the particularly preferred, embodiment of this development. Such a thermal decoupling is, for example, expedient or even necessary when a cooking vessel according to the invention designed as an induction cooking vessel is to be operated on a hob designed as a fully integrated induction hob. Fully integrated induction hobs of this kind are intended to be integrated homogeneously into a living space or the like, the related technology of these induction hobs being arranged under a stone, granite, ceramic plate or the like. Accordingly, the temperature on a base outer face of a base of the outer shell of the cooking vessel according to the invention facing the fully integrated induction hob must be able to be limited to 120° C. or less.

For this purpose, alternatively or in addition to the above-mentioned embodiment of the cooking vessel according to the invention, it can be provided that the outer shell has at least one groove on a base outer face of the base facing away from the inner shell when the cooking vessel is assembled, preferably that the groove is designed and arranged in such a way that, when the cooking vessel is placed on a hob, air from a free environment passes between the base of the outer shell of the cooking utensil and the hob by means of the groove.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cooking vessel, comprising:
a vessel body with at least one handle arranged on the vessel body, the vessel body delimiting a space for receiving food to be cooked, which space is open at a top in a use position of the cooking vessel and is intended for receiving food to be cooked, the vessel body comprising an outer shell which is connected or connectable to the handle, and an inner shell which is connected to the outer shell when the cooking vessel is assembled, the outer shell receiving the inner shell when the cooking vessel is assembled, and the space for receiving food to be cooked being formed in the inner shell,
wherein a wall inner face of the outer shell, which faces the inner shell when the cooking vessel is assembled, and a wall outer face of the inner shell, which faces the outer shell when the cooking vessel is assembled, are in each case designed conically in a mutually corresponding manner, and
wherein the outer shell, on a base inner face of a base of the outer shell facing the inner shell, and the inner shell, on a base outer face of a base of the inner shell facing the outer shell, in each case comprise mutually corresponding centering means which are in engagement with one another when the cooking vessel is assembled,
wherein the cooking vessel has a plurality of sensors which are arranged distributed over a height of the wall inner face of the outer shell, the plurality of sensors being connected to a controller of the cooking vessel in a signal-transmitting manner, the plurality sensors being arranged on the outer shell so as to be movable, relative to the outer shell, in a resilient manner,
wherein at least one sensor of the plurality of sensors is arranged on a wedge of the outer shell that diverges in a direction of the base of the outer shell, and
wherein the wedge is designed as a resilient wedge and is fastened to the outer shell and/or the wedge is resiliently fastened to the outer shell.

2. The cooking vessel according to claim 1, wherein the inner shell is releasably connected to the outer shell when the cooking vessel is assembled.

3. The cooking vessel according to claim 2, wherein the inner shell and the outer shell have mutually corresponding interlocking means for forming the releasable connection.

4. The cooking vessel according to claim 1, wherein the mutually corresponding interlocking means are designed as bayonet locking means for forming a bayonet closure.

5. The cooking vessel according to claim 1, wherein the centering means are arranged centrally on a respective base.

6. The cooking vessel according to claim 1, wherein a peripheral seal is arranged between the outer shell and the inner shell when the cooking vessel is assembled.

7. The cooking vessel according to claim 1,
wherein the outer shell is made of an electrically non-
conductive material.

8. The cooking vessel according to claim 1, wherein the
inner shell or the inner shell and the outer shell is/are formed
from a material suitable for a dishwasher.

9. The cooking vessel according to claim 1, wherein the
plurality of sensors are arranged on a wall inner face of the
outer shell, the wall inner face facing the inner shell.

10. The cooking vessel according to claim 1, wherein a
thermal insulation means is arranged between the outer shell
and the inner shell when the cooking vessel is assembled.

11. The cooking vessel according to claim 10, wherein the
thermal insulation means is arranged between a base inner
face of the outer shell and a base outer face of the inner shell.

12. The cooking vessel according to claim 10, wherein the
thermal insulation means is designed as an aerogel.

\* \* \* \* \*